United States Patent
Azadeh

(10) Patent No.: US 9,217,384 B2
(45) Date of Patent: Dec. 22, 2015

(54) DIAGNOSIS METHOD AND DEVICE FOR OPERATING AN INTERNAL COMBUSTION ENGINE

(75) Inventor: Reza Azadeh, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 320 days.

(21) Appl. No.: 14/001,269

(22) PCT Filed: Feb. 21, 2012

(86) PCT No.: PCT/EP2012/052924
§ 371 (c)(1),
(2), (4) Date: Oct. 1, 2013

(87) PCT Pub. No.: WO2012/113786
PCT Pub. Date: Aug. 30, 2012

(65) Prior Publication Data
US 2014/0014081 A1    Jan. 16, 2014

(30) Foreign Application Priority Data

Feb. 23, 2011   (DE) .......................... 10 2011 004 562

(51) Int. Cl.
*F02D 41/30*  (2006.01)
*F02D 41/00*  (2006.01)
*F02D 41/14*  (2006.01)
*F02D 41/22*  (2006.01)
*F02D 41/28*  (2006.01)

(52) U.S. Cl.
CPC ............ *F02D 41/009* (2013.01); *F02D 41/008* (2013.01); *F02D 41/1401* (2013.01);
(Continued)

(58) Field of Classification Search
CPC ... F02D 41/009; F02D 41/22; F02D 41/1456; F02D 41/008; F02D 41/0085; F02D 41/1495; F02D 2041/286

USPC ......... 123/672, 673, 688, 690, 691, 692, 704; 701/103, 107, 109, 110, 111; 73/114.71, 114.72, 114.73
See application file for complete search history.

(56) References Cited

U.S. PATENT DOCUMENTS 5,690,072 A   11/1997   Meyer et al. ................... 123/436
7,027,910 B1  4/2006    Javaherian et al. ........... 701/111
(Continued)

FOREIGN PATENT DOCUMENTS

DE   102004004291 B3   1/2005   ............. F02D 35/00
DE   102004043529 B3   9/2005   ............. F02D 33/00
(Continued)

OTHER PUBLICATIONS

International Search Report and Written Opinion, Application No. PCT/EP2012/052924, 17 pages, Jul. 23, 2012.

*Primary Examiner* — Hai Huynh
(74) *Attorney, Agent, or Firm* — Slayden Grubert Beard PLLC

(57) ABSTRACT

A method is disclosed for performing an individual cylinder diagnosis with respect to pollutant emissions within a predefined operating range of an internal combustion engine, meeting at least one predefined condition. During the performing of the individual cylinder diagnosis, a forced activation, by means of which a predefined air/fuel ratio to be set is activated, is prescribed in a manner synchronous to the cylinder segment. The excitation is carried out such that each individual cylinder is subjected during subsequent working cycles to a mixture that is either richer or leaner in comparison to the predefined air/fuel ratio to be set due to the forced excitation. Depending on the forcibly activated air/fuel ratio to be set, the corresponding injection valves are actuated.

18 Claims, 2 Drawing Sheets

(52) U.S. Cl.
CPC ........ *F02D41/1444* (2013.01); *F02D 41/1456* (2013.01); *F02D 41/22* (2013.01); *F01N 2900/1624* (2013.01); *F02D 41/1495* (2013.01); *F02D 41/1498* (2013.01); *F02D 2041/286* (2013.01); *F02D 2200/0816* (2013.01); *Y02T 10/40* (2013.01)

(56) References Cited

U.S. PATENT DOCUMENTS

| | | | |
|---|---|---|---|
| 7,331,214 B2 | 2/2008 | Aliakbarzadeh et al. | 73/23.32 |
| 7,676,317 B2 | 3/2010 | Aliakbarzadeh et al. | 701/103 |
| 7,703,437 B2 | 4/2010 | Scheffler et al. | 123/406.14 |
| 7,849,844 B2 | 12/2010 | Rösel | 123/672 |
| 8,347,700 B2 | 1/2013 | Azadeh | 73/114.31 |
| 2008/0009997 A1 | 1/2008 | Ketterer et al. | 701/101 |
| 2014/0326227 A1* | 11/2014 | Eser et al. | 123/673 |

FOREIGN PATENT DOCUMENTS

| | | | | |
|---|---|---|---|---|
| DE | 102005009101 B3 | 3/2006 | | F02D 41/14 |
| DE | 102005012835 A1 | 3/2006 | | F02D 41/00 |
| DE | 102006026390 A1 | 12/2007 | | F02D 41/14 |
| DE | 102007005680 B3 | 4/2008 | | F01D 11/00 |
| DE | 102008058008 B3 | 2/2010 | | F02D 41/00 |
| WO | 2012/113786 A1 | 8/2012 | | F02D 41/00 |

* cited by examiner

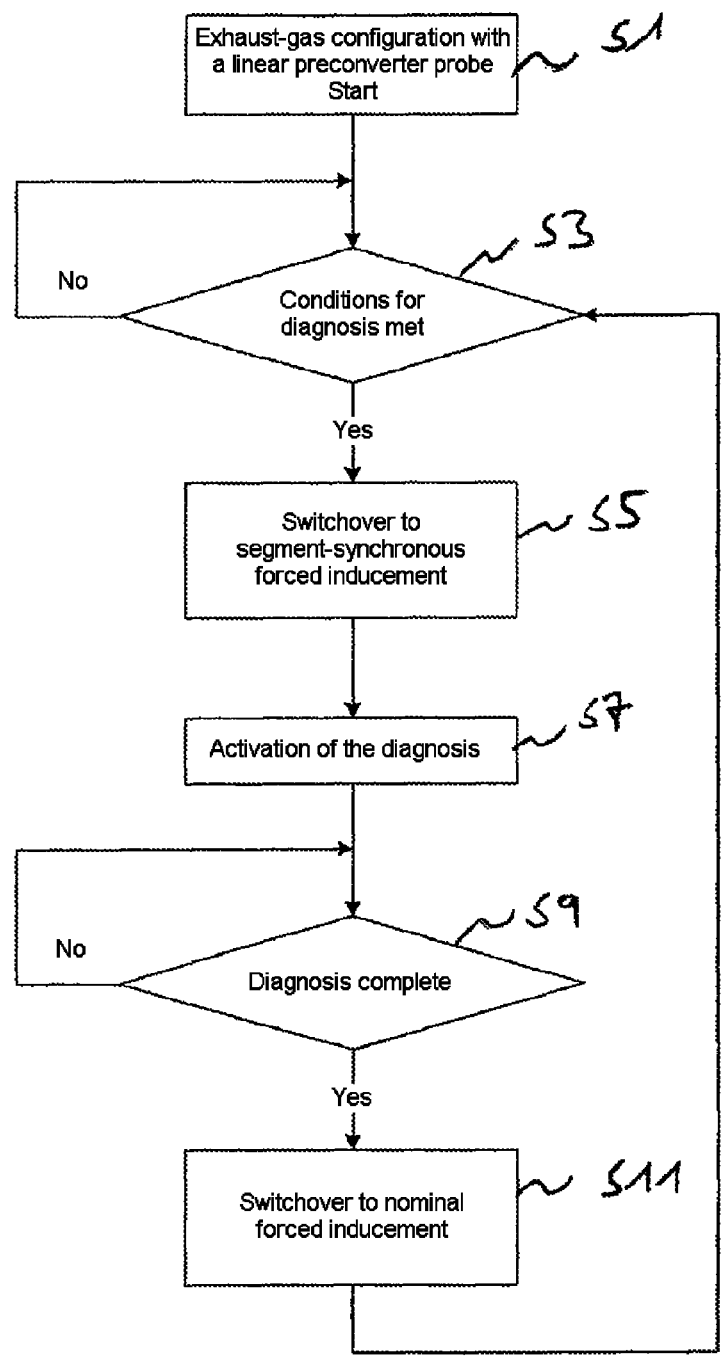

DIAGNOSIS METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2012/052924 filed Feb. 21, 2012, which designates the United States of America, and claims priority to DE Application No. 10 2011 004 562.7 filed Feb. 23, 2011, the contents of which are hereby incorporated by reference in their entirety.

TECHNICAL FIELD

This disclosure relates to a method and a device for operating an internal combustion engine having multiple cylinders to which there are assigned respective injection valves for the metering of fuel, and having an exhaust-gas probe which is arranged in an exhaust tract and whose measurement signal is characteristic of the air/fuel ratio in the respective cylinder, and having a crankshaft angle sensor whose measurement signal is representative of a crankshaft angle of a crankshaft.

BACKGROUND

Within the context of stringent legal regulations with regard to the pollutant emissions generated by motor vehicles, one important measure is to keep the pollutant emissions generated during the combustion of the air/fuel mixture in the respective cylinder of the internal combustion engine low. A further measure is to also use, in the case of internal combustion engines, exhaust-gas aftertreatment systems which convert the pollutant emissions generated during the combustion process of the air/fuel mixture in the respective cylinder into non-harmful substances. For this purpose, use is made of exhaust-gas catalytic converters which convert carbon monoxide, hydrocarbons and nitrogen oxides into non-harmful substances.

Both the targeted influencing of the generation of pollutant emissions during the combustion and also the conversion of the pollutant components with a high level of efficiency by means of the exhaust-gas catalytic converter necessitate a very precisely set air/fuel ratio in the respective cylinder.

In particular in the context of an increasingly very close-coupled arrangement of the exhaust-gas catalytic converters and also with regard to correspondingly specific legal regulations in individual countries, cylinder-specific precise setting of the air/fuel ratio is increasingly important because the individual exhaust-gas batches undergo only relatively poor mixing owing to the short mixing path.

Increasingly stringent legal regulations with regard to the emission of limited pollutants make it necessary to allow a small tolerance in the air/fuel ratio between the individual cylinders. A large uneven distribution and an absence of compensation leads to a considerable impairment of emissions, or even to noticeable drivability problems.

Furthermore, there are legal regulations for detecting the cylinder-selective uneven distribution in the air/fuel ratio, which leads to the exceedance of predefined emissions limit values, in a progressively increasing proportion of vehicles in relation to the vehicle fleets of the respective manufacturers.

For the purpose of cylinder-specific precise setting of the respective air/fuel ratio in the respective combustion chambers of the respective cylinders, it is known from DE 10 2005 009 101 B3 for a measurement signal of an exhaust-gas probe to be detected, and assigned to the respective cylinder, at a predefined sensing crankshaft angle in relation to a reference position of the piston of the respective cylinder. By means of in each case one controller, a controller value for influencing the air/fuel ratio in the respective cylinder is determined as a function of the measurement signal detected for the respective cylinder. When predefined first conditions are met, which include a first temperature range of a temperature which is representative of a temperature of the respective injection valve, and which include the presence of a virtually steady operating state, a first adaptation value is determined as a function of the controller value.

When predefined second conditions are met, which include a predefined second temperature range of the temperature which is representative of the temperature of the respective injection valve, and which include the presence of a virtually steady operating state, a second adaptation value is determined as a function of the controller value.

A corrective value for influencing the air/fuel ratio in the respective cylinder is determined as a function of the first and/or second adaptation value as a function of the temperature which is representative of the temperature of the respective injection valve.

From DE 10 2004 004 291 B3, it is known to use cylinder-specific lambda control, the intention of which is to minimize the individual deviations of the respective cylinder-specific air/fuel ratios with respect to a mean air/fuel ratio. A measurement signal of an exhaust-gas probe arranged in an exhaust tract, said measurement signal being characteristic of the air/fuel ratio in the respective cylinder, is detected at a predefined crankshaft angle with respect to a reference position of the piston of the respective cylinder and is assigned to the respective cylinder. By means of the cylinder-specific lambda control, an actuation variable for influencing the air/fuel ratio in the respective cylinder is generated as a function of the measurement signal generated for the respective cylinder. The predefined crankshaft angle is adapted as a function of an instability criterion of the controller.

DE 10 2006 026 390 A1 discloses an electronic control device for the control of the internal combustion engine in a motor vehicle, having a running irregularity determination unit and having an injection quantity correction unit, wherein a defined group of cylinders is assigned one lambda probe. The injection quantity correction unit is configured such that the injection quantity of one cylinder, which is to be tested, of the defined group can be adjusted in the lean direction by a difference adjustment value assigned to a running irregularity difference value, and the injection quantity of at least one of the other cylinders assigned to the same lambda probe can be correspondingly adjusted in the rich direction, such that overall, a predefined lambda value of said group, preferably a lambda value of at least approximately 1, is attained. The injection quantity correction unit is also configured such that, in this way, a cylinder-specific difference adjustment value can be set for each cylinder of the defined group, and that cylinder-specific correction values can be determined by virtue of the cylinder-specific difference adjustment values being set in a ratio with respect one another.

SUMMARY

One embodiment provides a method for operating an internal combustion engine having multiple cylinders to which there are assigned respective injection valves for the metering of fuel, and having an exhaust-gas probe which is arranged in an exhaust tract and whose measurement signal is characteristic of the air/fuel ratio in the respective cylinder, and having a crankshaft angle sensor whose measurement signal is representative of a crankshaft angle of a crankshaft, in which method, within a predefined operating range of the internal combustion engine, when at least one predefined condition is met, a cylinder-specific diagnosis is carried out with regard to pollutant emissions, wherein during the execution of the cylinder-specific diagnosis, a forced inducement by which a predefined air/fuel ratio to be set is induced is predefined in a cylinder-segment-synchronous manner, specifically in such a way that, during successive working cycles, the respective individual cylinders are charged in each case with a mixture which is either enriched or leaned by the forced inducement in relation to the predefined air/fuel ratio to be set, wherein the respective injection valves are actuated as a function of the forcibly induced air/fuel ratio to be set.

In a further embodiment, during the diagnosis, the forced inducement is predefined such that the period duration of the forced inducement corresponds to a present time duration of two cylinder segments.

In a further embodiment, during the diagnosis, the forced inducement is predefined such that the period duration of the forced inducement corresponds to a present time duration of one half of the number of cylinder segments per cylinder bank.

In a further embodiment, the period duration and/or amplitude of the forced inducement is set during the diagnosis as a function of a maximum oxygen storage capacity of an exhaust-gas catalytic converter.

In a further embodiment, the diagnosis comprises a cylinder-specific diagnosis, based on running irregularity, with regard to pollutant emissions.

In a further embodiment, the diagnosis comprises cylinder-specific lambda control.

Another embodiment provides a device for operating an internal combustion engine having multiple cylinders to which respective injection valves are assigned for the metering of fuel, and having an exhaust-gas probe which is arranged in an exhaust tract and whose measurement signal is characteristic of the air/fuel ratio in the respective cylinder, and having a crankshaft angle sensor whose measurement signal is representative of a crankshaft angle of a crankshaft, wherein the device is designed such that, within a predefined operating range of the internal combustion engine, when at least one predefined condition is met, a cylinder-specific diagnosis is carried out with regard to pollutant emissions, wherein during the execution of the cylinder-specific diagnosis, a forced inducement by which a predefined air/fuel ratio to be set is induced is predefined in a cylinder-segment-synchronous manner, specifically in such a way that, during successive working cycles, the respective individual cylinders are charged in each case with a mixture which is either enriched or leaned by the forced inducement in relation to the predefined air/fuel ratio to be set, wherein the respective injection valves are actuated as a function of the forcibly induced air/fuel ratio to be set.

BRIEF DESCRIPTION OF THE DRAWINGS

Example embodiments are discussed below in detail with reference to the drawings, in which:

FIG. 2 shows a flow diagram of a program for the operation of the internal combustion engine.

DETAILED DESCRIPTION

Figure 1:
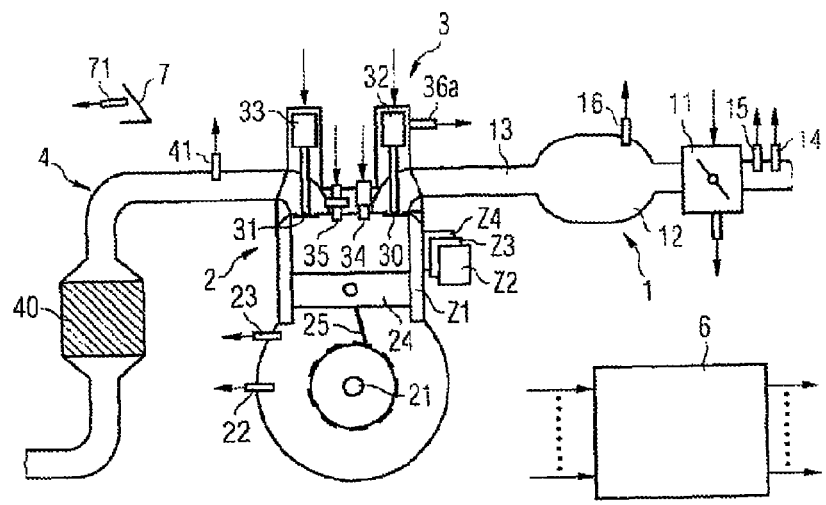
FIG. 1 shows an internal combustion engine with a control device.

Some embodiments disclosed herein provide a method and a device for operating an internal combustion engine, which method and device permit particularly reliable operation of the internal combustion engine.

Some embodiments provide a method and a corresponding device for operating an internal combustion engine having multiple cylinders to which there are assigned respective injection valves for the metering of fuel, and having an exhaust-gas probe which is arranged in an exhaust tract and whose measurement signal is characteristic of the air/fuel ratio in the respective cylinder, and having a crankshaft angle sensor whose measurement signal is representative of a crankshaft angle of a crankshaft. Within a predefined operating range of the internal combustion engine, when at least one predefined condition is met, a cylinder-specific diagnosis is carried out with regard to pollutant emissions. The predefined condition may for example be met in the case of a predefined virtually steady operating state and/or after the expiry of a predefined time duration or driving distance.

During the execution of the cylinder-specific diagnosis, a forced inducement by which a predefined air/fuel ratio to be set is induced is predefined in a cylinder-segment-synchronous manner, specifically in such a way that, during successive working cycles, the respective individual cylinders are charged in each case with a mixture which is either enriched or leaned by the forced inducement in relation to the predefined air/fuel ratio to be set. The respective injection valves are actuated as a function of the forcibly induced air/fuel ratio to be set.

A cylinder segment is the fraction corresponding to the entire crankshaft angle of one working cycle divided by the number of cylinders of the internal combustion engine. Thus, in the case of a four-stroke internal combustion engine with four cylinders, the length of a cylinder segment is 180° crankshaft angle.

By means of this approach, it is the case in particular, if appropriate, that undesired influences on the diagnosis result owing to the control dynamics of the forced inducement required for the oxidation and reduction of the exhaust-gas catalytic converter are kept low. For example in the case of a cylinder-specific, lambda-control-based diagnosis, the influence of the forced inducement, whose period duration is applied independently of the respective duration of the respective cylinder segment, can incidentally draw one cylinder in a rich or lean direction and thus call into question the validity of the respective diagnosis result. A corresponding effect may correspondingly generate a torque difference between the cylinders and thus distort the result of a diagnosis based on running irregularity.

By means of the cylinder-segment-synchronous predefinition of the forced inducement in such a way that, during successive working cycles, the respective individual cylinders are charged in each case with a mixture which is either enriched or leaned by the forced inducement in relation to the predefined air/fuel ratio to be set, such undesired influences can be eliminated or at least approximately eliminated and thus the quality of the diagnosis can be influenced in a highly positive manner.

In one refinement, during the diagnosis, the forced inducement is predefined such that the period duration of the forced inducement corresponds to a present time duration of two cylinder segments. In this way, it can be ensured in a simple manner that, during the diagnosis, the respective cylinder is in each case charged substantially with the same air/fuel ratio, and this can then thus be taken into consideration within the context of the diagnosis in relation to the respective cylinder.

In a further refinement, during the diagnosis, the forced inducement is predefined such that the period duration of the forced inducement corresponds to a present time duration of one half of the number of cylinder segments per cylinder bank. In this way, it can likewise be ensured in a simple manner that, during the diagnosis, the respective cylinder is reliably charged with in each case approximately the same air/fuel ratio of the mixture.

In a further refinement, the period duration and/or the amplitude of the forced inducement is set during the diagnosis as a function of a maximum oxygen storage capacity of the exhaust-gas catalytic converter. This can contribute in a simple manner to the pollutant emissions being kept as low as possible even during the diagnosis.

In a further refinement, the diagnosis comprises a cylinder-specific diagnosis, based on running irregularity, with regard to pollutant emissions.

In a further refinement, the diagnosis comprises a cylinder-specific lambda regulation.

Exemplary embodiments of the invention will be explained in more detail below on the basis of the schematic drawings.

By means of the execution of the cylinder-specific diagnosis, based on running irregularity, with regard to pollutant emissions, it is possible for an exceedance of pollutant emissions, in particular above an admissible range, to be detected at an early time. If the diagnosis comprises the implementation of the cylinder-specific lambda control, it is for example also possible for a component-based diagnosis to take place. For example, a detection of a faulty injection valve, which has for example a coked nozzle needle or else depositions on the injection valve which lead to an impairment of the injection, is made possible.

Within the context of the cylinder-specific diagnosis based on running irregularity, there takes place, for example, an active adjustment of the air/fuel ratio in the respective cylinders. For example, the air/fuel ratio of the cylinder presently to be analyzed is progressively adjusted ever further in the lean direction, wherein corresponding compensation is realized by correspondingly opposed adjustment of the air/fuel ratio in the respective other cylinders. Such a variation of the respective air/fuel ratio preferably takes place until a running irregularity value has reached or exceeded a predefined threshold value.

The diagnosis may then for example take place by means of the actuation signal, which is adjusted at said time, for the respective cylinder, which actuation signal may for example also be representative of an adjusted injection quantity, and by means of a comparison of said adjustment signal/injection quantity with a reference value which corresponds for example to the mean value of the respective cylinder during the execution of the diagnosis for the individual cylinders. In the case of a correspondingly high deviation, such as for example greater than 25%, it is then possible for a fault which is relevant to emissions to be inferred, and corresponding measures can be initiated.

An internal combustion engine (FIG. 1) comprises an intake tract 1, an engine block 2, a cylinder head 3 and an exhaust tract 4. The intake tract 1 preferably comprises a throttle valve 11 and also a manifold 12 and an intake pipe 13 which leads to a cylinder Z1 via an inlet duct into the engine block 2. The engine block 2 also comprises a crankshaft 21 which is coupled to a piston 24 of the cylinder Z1 via a connecting rod 25.

The cylinder head 3 comprises a valve drive with a gas inlet valve 30, a gas outlet valve 31 and valve drives 32, 33. The cylinder head 3 also comprises an injection valve 34 and an ignition plug 35. The injection valve 34 may alternatively also be arranged in the intake tract 1.

The exhaust tract 4 comprises an exhaust-gas catalytic converter 40, which is preferably in the form of a three-way catalytic converter.

A control device 6 is provided to which there are assigned sensors which detect various measurement variables and determine the measurement values of the measurement variables. Operating variables include not only the measurement variables but also variables derived from these.

As a function of at least one of the operating variables, the control device 6 controls the actuation elements which are assigned to the internal combustion engine, and to which corresponding actuation drives are assigned in each case, by generating actuation signals for the actuation drives.

The control device 6 may also be referred to as a device for operating the internal combustion engine.

The sensors are a pedal position sensor 71 which detects the position of an accelerator pedal 7, an air mass sensor 14 which detects an air mass flow upstream of the throttle flap 11, a temperature sensor 15 which detects an intake air temperature, a pressure sensor 16 which detects the intake pipe pressure, a crankshaft angle sensor 22 which detects a crankshaft angle to which a rotational speed N is then assigned, a torque sensor 23 which detects a torque of the crankshaft 21, a camshaft angle sensor 36a which detects a camshaft angle, and an exhaust-gas probe 41 which detects a residual oxygen content in the exhaust gas and whose measurement signal is characteristic of the air/fuel ratio in the cylinder Z1 during the combustion of the air/fuel mixture. The exhaust-gas probe 41 is preferably in the form of a linear lambda probe and thus generates a measurement signal proportional to the air/fuel ratio over a wide relevant range thereof.

Depending on the embodiment, any desired subset of the stated sensors may be provided, or additional sensors may also be provided.

The actuation elements are for example the throttle flap 11, the gas inlet and gas outlet valves 30, 31, the injection valve 34 or the ignition plug 35.

Aside from the cylinder Z1, further cylinders Z2 to Z4 are also provided, to which corresponding actuation elements are then also assigned. It is preferable for each exhaust-gas bank of cylinders, which may also be referred to as cylinder bank, to be assigned in each case one exhaust-gas strand of the exhaust tract 4, and for in each case one exhaust-gas probe 41 to be correspondingly assigned to the respective exhaust-gas strand.

The control device 6 preferably comprises a processing unit and a memory for storing data and programs. For the operation of the internal combustion engine, the control device 6 has stored therein a program for operating the internal combustion engine, which program can be executed in the processing unit during operation and is configured to carry out a cylinder-specific diagnosis with regard to pollutant emissions when at least one predefined condition is met. The program is for example started in a step S1 (FIG. 2), specifically for example shortly after a start-up of the internal combustion engine.

In a step S3, it is checked whether a predefined condition is met. The predefined condition may for example be met if a virtually steady operating state is present and/or if a predefined time duration has elapsed since the most recent time the condition was met and/or a predefined distance has been traveled since the most recent time the condition was met.

If the condition of step S3 is not met, then step S3 is carried out again, if appropriate after a predefined waiting time duration has elapsed. By contrast, if the condition of step S3 is met, then in a step S5, a forced inducement by which a predefined air/fuel ratio to be set is induced is predefined in a cylinder-segment-synchronous manner. This takes place in such a way that, during successive working cycles, the respective individual cylinders are charged in each case with a mixture which is either enriched or leaned by the forced inducement in relation to the predefined air/fuel ratio to be set. The injection valves 34 are actuated as a function of the forcibly induced air/fuel ratio to be set.

The amplitude of the forced inducement is preferably predefined or else adapted as a function of the emissions and/or catalytic-converter-specific characteristics. Thus the amplitude, or if appropriate also the period duration of the forced inducement, is set during the diagnosis as a function of a maximum oxygen storage capacity of the exhaust-gas catalytic converter 40.

In a step S7, the diagnosis is then activated and thus carried out. The diagnosis may for example comprise a cylinder-specific diagnosis, based on running irregularity, with regard to pollutant emissions. The diagnosis may however alternatively or additionally also comprise cylinder-specific lambda control and be carried out, for example, as a function of an adaptation value determined by means of the cylinder-specific lambda control.

The respective influence of the forced inducement on the air/fuel ratio in the respective cylinder is taken into consideration in the diagnosis. In this connection, it is advantageous for the gas propagation times of the respective exhaust-gas batches to be taken into consideration as a function of probe position and/or load and/or rotational speed in the case of the expected air/fuel ratio in the respective cylinder. This may be realized in a particularly simple manner by means of corresponding predefined characteristic maps with the corresponding number of input variables corresponding to the variables mentioned above.

Furthermore, it may also be advantageous to take into consideration a correlation between an induced stimulation, generated by the forced inducement, with respect to the actual deviation. For example, a forced inducement of +/−3% may for example lead to a deviation of 2.5% in the measurement signal of the exhaust-gas probe 41. In particular the influence of the forced inducement is thus taken into consideration in the diagnosis in this way. Said forced inducement thus does not have an indeterminate and in particular distorting influence on the diagnosis.

Furthermore, by means of the inducement that continues to take place by means of the forced inducement, as low as possible a pollutant emission can be attained, and also an adverse effect on the exhaust-gas catalytic converter 40 can be avoided, during the diagnosis.

In a step S9, it is checked whether the diagnosis is complete. If this is not the case, then the execution is continued again in step S9, if appropriate after the predefined waiting time duration has elapsed. If the diagnosis is complete, then in a step S11 following step S9, the forced inducement is switched back to a nominal forced inducement which is predefined outside the operation with the diagnosis and which may be for example predefined with a fixedly predefined period duration.

Figure 3:
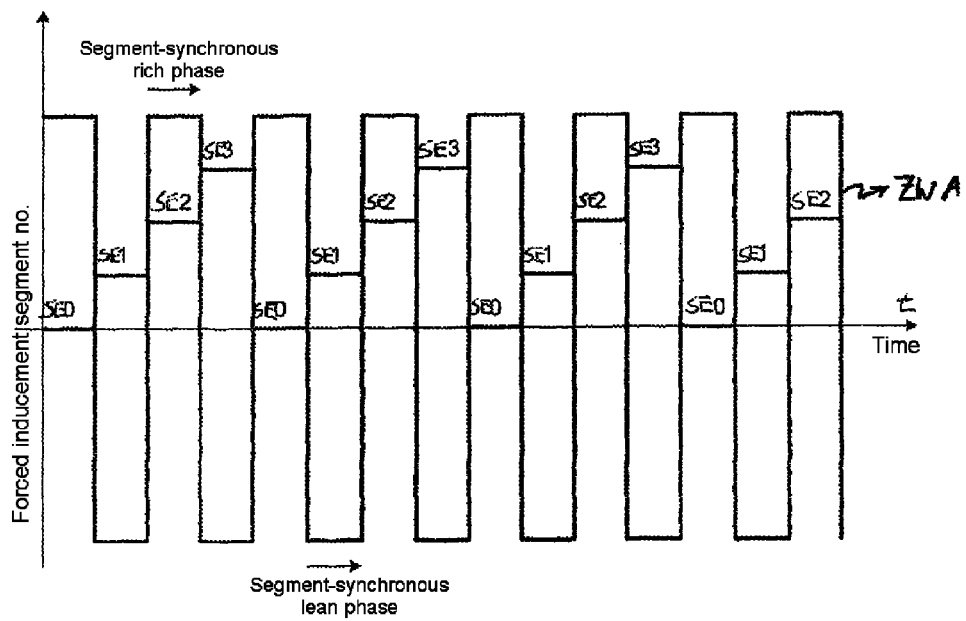
FIG. 3 shows a diagram in which a predefined, forcibly induced air/fuel ratio to be set is plotted against the time.

An exemplary profile ZWA_V of the forced inducement is plotted by way of example against the time t in FIG. 3. Likewise plotted against the time in FIG. 3 are the respective cylinder segment durations, represented by SE0, SE1, SE2 and SE3. A constant rotational speed is present in this case, such that the period duration of the forced inducement does not change over the illustrated time duration. In reality, however, this may change if the rotational speed changes, because the forced inducement is predefined in a cylinder-segment-synchronous manner during the diagnosis.

It can also be seen from FIG. 3 that, for the respective cylinder, the forced inducement also influences the air/fuel ratio in the same way in each case in successive working cycles.

What is claimed is:

1. A method for operating an internal combustion engine including multiple cylinders corresponding to respective injection valves for the metering of fuel, an exhaust-gas probe arranged in an exhaust tract and configured to generate a measurement signal representative of an air/fuel ratio in a respective cylinder, and a crankshaft angle sensor configured to generate a measurement signal representative of a crankshaft angle of a crankshaft, the method comprising:
    within a predefined operating range of the internal combustion engine, when at least one predefined condition is met, performing a cylinder-specific diagnosis with regard to pollutant emissions,
    during the cylinder-specific diagnosis, defining in a cylinder-segment-synchronous manner a forced inducement configured to induce a predefined air/fuel ratio to be set, and
    during successive working cycles:
        charging each respective individual cylinder with a mixture that is either enriched or leaned by the defined forced inducement in relation to the predefined air/fuel ratio to be set, and
        actuating each respective injection valve as a function of the forcibly induced air/fuel ratio to be set.

2. The method of claim 1, comprising, during the cylinder-specific diagnosis, defining the forced inducement such that a duration of the forced inducement corresponds to a present time duration of two cylinder segments.

3. The method of claim 1, comprising, during the cylinder-specific diagnosis, defining the forced inducement such that a duration of the forced inducement corresponds to a present time duration of one half of a number of cylinder segments in a cylinder bank.

4. The method of claim 1, comprising setting at least one of a duration and an amplitude of the forced inducement during the cylinder-specific diagnosis as a function of a maximum oxygen storage capacity of an exhaust-gas catalytic converter.

5. The method of claim 1, wherein the cylinder-specific diagnosis comprises a cylinder-specific diagnosis, based on running irregularity, with regard to pollutant emissions.

6. The method of claim 1, wherein the cylinder-specific diagnosis comprises cylinder-specific lambda control.

7. A device for operating an internal combustion engine including multiple cylinders corresponding to respective injection valves for the metering of fuel, an exhaust-gas probe arranged in an exhaust tract and configured to generate a measurement signal characteristic of an air/fuel ratio in a respective cylinder, and a crankshaft angle sensor configured to generate a measurement signal representative of a crankshaft angle of a crankshaft,
    wherein the device is configured to:
        within a predefined operating range of the internal combustion engine, when at least one predefined condition is met, perform a cylinder-specific diagnosis with regard to pollutant emissions,
        during the cylinder-specific diagnosis, define a forced inducement configured to induce a predefined air/fuel ratio to be set, and during successive working cycles:
charge each respective individual cylinder with a mixture that is either enriched or leaned by the defined forced inducement in relation to the predefined air/fuel ratio to be set, and
actuate each respective injection valve as a function of the forcibly induced air/fuel ratio to be set.

8. The device of claim 7, wherein the device is configured to, during the cylinder-specific diagnosis, define the forced inducement such that a duration of the forced inducement corresponds to a present time duration of two cylinder segments.

9. The device of claim 7, wherein the device is configured to, during the cylinder-specific diagnosis, define the forced inducement such that a duration of the forced inducement corresponds to a present time duration of one half of a number of cylinder segments in a cylinder bank.

10. The device of claim 7, wherein the device is configured to set at least one of a duration and an amplitude of the forced inducement during the cylinder-specific diagnosis as a function of a maximum oxygen storage capacity of an exhaust-gas catalytic converter.

11. The device of claim 7, wherein the cylinder-specific diagnosis comprises a cylinder-specific diagnosis, based on running irregularity, with regard to pollutant emissions.

12. The device of claim 7, wherein the cylinder-specific diagnosis comprises cylinder-specific lambda control.

13. An internal combustion engine comprising:
multiple cylinders corresponding to respective injection valves for the metering of fuel,
an exhaust-gas probe arranged in an exhaust tract and configured to generate a measurement signal characteristic of an air/fuel ratio in a respective cylinder,
a crankshaft angle sensor configured to generate a measurement signal representative of a crankshaft angle of a crankshaft, and
a control device is configured to:
within a predefined operating range of the internal combustion engine, when at least one predefined condition is met, perform a cylinder-specific diagnosis with regard to pollutant emissions,
during the cylinder-specific diagnosis, define a forced inducement configured to induce a predefined air/fuel ratio to be set, and
during successive working cycles:
charge each respective individual cylinder with a mixture that is either enriched or leaned by the defined forced inducement in relation to the predefined air/fuel ratio to be set, and
actuate each respective injection valve as a function of the forcibly induced air/fuel ratio to be set.

14. The internal combustion engine of claim 13, wherein the control device is configured to, during the cylinder-specific diagnosis, define the forced inducement such that a duration of the forced inducement corresponds to a present time duration of two cylinder segments.

15. The internal combustion engine of claim 13, wherein the control device is configured to, during the cylinder-specific diagnosis, define the forced inducement such that a duration of the forced inducement corresponds to a present time duration of one half of a number of cylinder segments in a cylinder bank.

16. The internal combustion engine of claim 13, wherein the control device is configured to set at least one of a duration and an amplitude of the forced inducement during the cylinder-specific diagnosis as a function of a maximum oxygen storage capacity of an exhaust-gas catalytic converter.

17. The internal combustion engine of claim 13, wherein the cylinder-specific diagnosis comprises a cylinder-specific diagnosis, based on running irregularity, with regard to pollutant emissions.

18. The internal combustion engine of claim 13, wherein the cylinder-specific diagnosis comprises cylinder-specific lambda control.

* * * * *